April 18, 1961 H. BECKERS 2,980,250
SYSTEM FOR TESTING AND SORTING COIL CORES
Filed Oct. 3, 1957 2 Sheets-Sheet 2

United States Patent Office 2,980,250
Patented Apr. 18, 1961

2,980,250

SYSTEM FOR TESTING AND SORTING COIL CORES

Hans Beckers, M. Gladbach, Germany, assignor to Walter Reiners, M. Gladbach, Germany Filed Oct. 3, 1957, Ser. No. 688,021

Claims priority, application Germany Oct. 6, 1956

17 Claims. (Cl. 209—75)

My invention relates to an apparatus or process for testing coil cores that are automatically supplied to automatic winding machines or other textile fabricating machinery.

The feeding of empty cores to automatic winding machines for the purpose of winding bobbins and other coil packages of yarn commences with a conveying operation. Thereafter the cores are aligned on a slideway whence they pass individually, at a rate in accordance with the demand, to a supplying mechanism or directly to the winding station, so that they may be substituted for a filled core previously discharged from the winding station. When the available supply of cores is non-uniform, for example including cores of varying dimensions, such as different diameters or lengths, or if the supply includes cores which are broken and hence shorter than standard cores, the above-mentioned substitution or exchanging operation is subject to fault, because the proper functioning of the winding equipment is obtainable only with cores of standard dimensions.

It is a general object of my invention to eliminate these operational difficulties.

According to the invention, I employ an automatic testing step by means of which all substandard cores, those not having the prescribed dimensions or form, are eliminated, or they are indicated so that the defective cores can be discarded manually. This testing step is introduced into the supply system of the cores from the magazine to the winding machine or other textile machine proper. With automatic elimination the defective cores drop out of the conveying path, while the acceptable cores pass through a checking operation.

It is advantageous, according to another feature of my invention, to construct the testing device in such a manner that it represents or includes an upwardly directed step which must be overcome or surmounted by the specimen being tested, after it has been moved or lifted by a conveying member in the direction toward the top of the step. This lifting motion is of a predetermined length, and since the said conveying member acts upon the bottom end of the specimen in the direction of the step height, it is made certain, by virtue of the prefixing of the step height, that specimens of standard length can overcome the step when the said conveying or lifting member has reached its uppermost position. On the other hand, if the specimen is too short it cannot get over the step, and it then returns into the position blocked by the step, or is ejected, or drops out. Depending upon the specific construction or design, a signalling operation may take place at the location where the specimen returns to its prior position, thus indicating that a substandard specimen is located in the device and has to be eliminated manually.

In the case where the apparatus is so designed that the specimen automatically leaves the conveying path, the leaving specimen can be selectively supplied to one of several auxiliary conveying paths, in dependence upon the type of its defect. It is important that coil bodies which contain a residual number of yarn windings, but are otherwise of standard dimensions, be separated from coil bodies which, due to damage or mistake, do not correspond to the standard dimensions. The coils with an undesired residual winding of yarn are supplied to an intermediate fabricating operation which removes the residual winding. The damaged or incorrectly dimensioned coil bodies are to be taken completely out of circulation. The latter procedure for separating the individual different specimens is preferably carried out by providing several outlet paths at the end of the main supplying conveyor path, and by also providing a checking device thereat which acts upon the specimen to automatically select, in response to the checking operation, the particular outlet path to be chosen.

For this purpose, and in accordance with still another feature of my invention, the testing device is provided with measuring means which determines the proper dimensions of the specimen between predetermined minimum and maximum values. The measured magnitudes, dimensions, or criterion may consist of the entering width of the specimen, where it passes into the second conveying path, or it may be the spacing of the main supplying conveyor from the testing device or its parts.

According to a further feature of the invention, the testing device is mounted at the end or end region of an inclined plane, the individual specimens being thereby automatically and sequentially guided toward said region. A single or double lock is used to prevent entry of too many specimens simultaneously into the testing device. The outlet conveyors for discarding unsuitable specimens may also comprise one or several inclined planes. However, it is advantageous, according to still another feature of my invention, to provide a free space for receiving those specimens that because of faulty design or complete unsuitability must be completely discarded from the circulation. These coil bodies drop into the free space and thus pass into a collecting container. It is of further advantage to mount the measuring device, which tests the specimens for a given thickness, at the entrance of one of the outlet paths and to construct it essentially in the form of an adjustable caliper gauge. If the specimen does not satisfy the predetermined dimensions, it will be prevented from entering into said one conveying path and thus will select a different conveying path, or will drop through the free space, entirely out of the core circulation system.

The foregoing and other objects, advantages and features of my invention, these features being set forth with particularity in the claims annexed hereto, will be apparent from the embodiments shown by way of example on the accompanying drawings in which:

Fig. 10 is a schematic illustration in perspective of another embodiment of the testing system, employing a checking component located in the center;

Figs. 11 to 14 illustrate the testing operation schematically, as applied to different specimens, in the testing device constructed according to Fig. 10.

Figure 1:
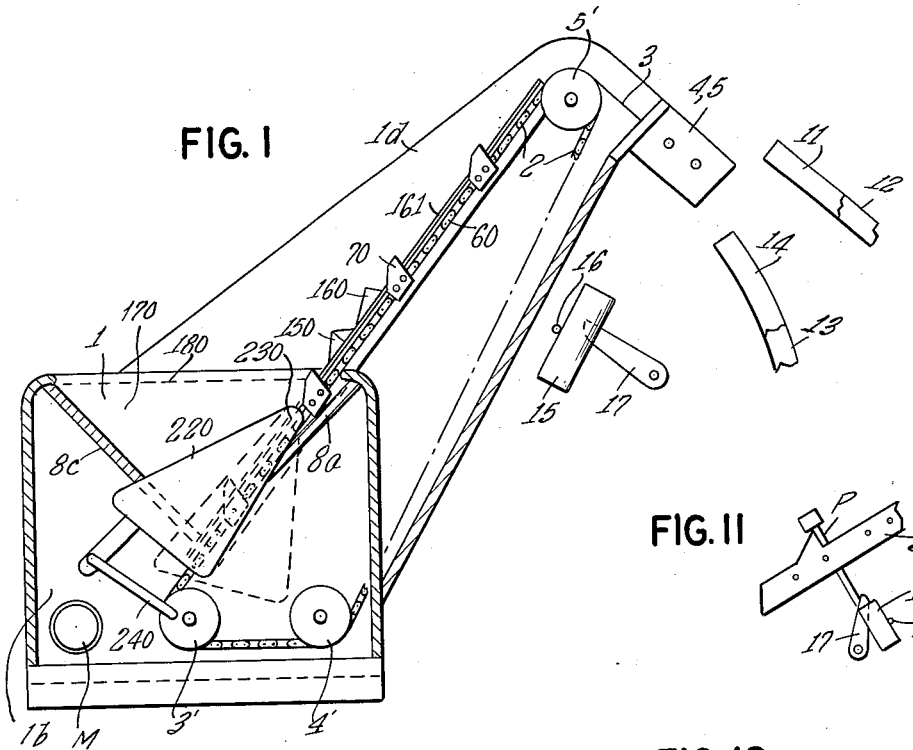
Fig. 1 is a schematic illustration of a conveying system at whose end a testing device constructed in accordance with the invention is mounted.

In Fig. 1 there is illustrated, in side view, an upwardly inclined and directed feeder for supplying bobbin cores to a winding machine, or other textile machine. The feeder apparatus is similar to that more fully illustrated and described in my copending application Serial No. 498,728, filed April 11, 1955, for Hopper-Type Feeder for Bobbin Cores, now issued as Patent No. 2,891,697, dated June 23, 1959. All of the relevant disclosure of that application is incorporated herein by reference.

The feeder apparatus comprises a funnel-shaped hopper or trough 1 from which an inclined upwardly directed, endless conveyor 2 lifts the bobbin cores individually up to a downwardly inclined conveying path or slide-way of which only the upper end is shown in Fig. 1. The endless conveyor 2 is more fully described in the said copending application. Briefly, it comprises a rear wall 1d, a funnel shaped hopper 1 comprising walls 8a and 8c for empty quills or core tubes, and an endless conveyor chain 60 carried about sprockets 3', 4', 5' and moving under a stationary longitudinally slotted structure indicated at 161. Attached to the chain are a number of grippers or cleats 70, preferably evenly spaced. The cleats, during their travel, enter from below into the space of hopper 1, and are guided into a slot formed between two cheek faces (not shown) along the inclined structure 161, under which the chain 60 runs. Fixed guide pieces 150, 160 assist in the proper orientation of the cores, as more fully explained in the copending application. Movable partition 220 is controlled by sprocket wheel 3' through a crank pin on the wheel and connecting rod 240. Partition 220 imparts a preliminary longitudinal or lengthwise orientation to the cores. M is the motor for sprocket 3'. These detailed features are primarily the subject matter being claimed in the copending application. Their general purpose and effect is to deliver the cores, with their heads up and stems down, to the downwardly inclined slide-way.

Figure 2:
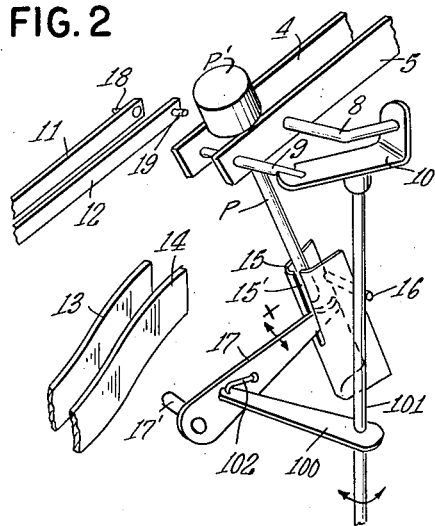
Fig. 2 is a perspective view of the details of the same testing device, equipped with stationary supply rails.
Figure 3:
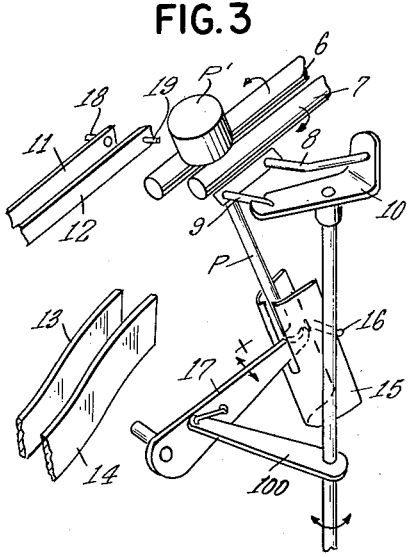
Fig. 3 is a perspective view of a similar testing device in which axially rotating rods are employed as supply rails.
Figure 4:
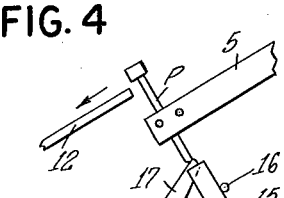
Figs. 4 to 8 illustrate the testing operation schematically, as performed with or upon different specimens, in a testing device constructed according to Figs. 2 and 3.

The downwardly inclined conveyor or transferring means either comprises, as support elements, the two horizontally spaced rails 4, 5 shown in Fig. 2 or the rotating rods 6, 7 shown in Fig. 3. These support elements form together a downwardly inclined conveyance means or slide which passes the cores to the textile or winding machine (not shown) for further fabrication.

The lowermost ends of the rails 4 and 5 are provided with a lock device or stop means comprising two latch pieces 8 and 9 (Figs. 2, 3). The latch pieces are alternately pushed into the conveyor path by means of double-armed lever 10. Located opposite the end of the rails 4 and 5, and upwardly spaced therefrom, are two rails 11 and 12 forming one discharging conveyor or core receiving means. This conveyor can be considered part of a textile fabricating machine. Positioned beneath the rails 4 and 5 and offset therefrom are the ends of rails 13 and 14 forming a second discharging conveyor or receiving means. Also located beneath the rails 4 and 5 is a positioning device or selective means including a trough-shaped plate 15 (Figs. 1, 2, 3) which is spaced a given distance away from the upper edges of the rails. Plate 15 is equipped with a preferably adjustable measuring pin or obstacle 16 extending transversely to the longitudinal direction or long dimension of the core specimens. A core lifting lever 17 enters, from the front, through slot 15' in sheet 15. The slot 15' is in the direction of the length of the stem P; it is wide enough to allow the lever to oscillate in and beyond the slot, but not so wide as to permit the stem to pass through and beyond. The reason for the member 15 and the slot 15' is to center the stems of the correct length so that the core lifting lever 17 can contact the ends of all the cores which are of the correct length. The lever or lift means 17, which forms part of the positioning device, is kept in upward and downward reciprocation in the direction indicated by a double-headed arrow X. A suitable drive such as a crank mechanism (not illustrated) can be connected to pivot 17' of lever 17, or directly to lever 17, for this purpose. The outer end of lever 17 has a recess which catches beneath the lower end face of the core specimen P and lifts the specimen a predetermined amount. If the core stem is too long, i.e. of sufficient length in one spacial dimension, pin 16 keeps its lower end out of range of the lever 17, so that it cannot be lifted over obstacle plate 15, whereupon it tilts over the edge of plate 15 and drops downwardly through the free space below.

The specimen P, which in the case illustrated has a relatively thick head portion and a slender stem portion, has its head portion P' located on the upper edges of the supply conveyor rails 4, 5 or rods 6, 7. If the stem of the core is too long, transverse rod 16 prevents its passage to both the upper and lower conveyor rails. If the length of the slender portion is in accordance with the desired measure, then the lifting of the specimen by means of the lever 17 has the effect of raising the lower lateral edge of the thick head portion to such an extent that the specimen can enter into the higher entrance side of the outlet conveyor rail 11, 12 as soon as the lock is opened by withdrawing the latch 9. Such opening can be effected by linking or coupling the shaft of lever 10 with the movement of or with the drive that actuates the lever 17. A linkage is shown, in Figs. 2 and 3, for this purpose, comprising an arm 100, fixed to pivot rod 101 of latch lever 10, and a connecting pin 102 pivotally connected to lever 17 and arm 100 at each end.

Figure 5:
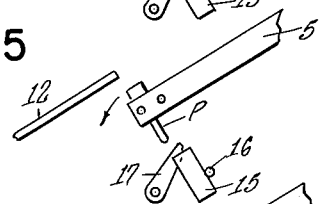
Figure 6:
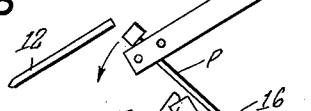
Figure 7:
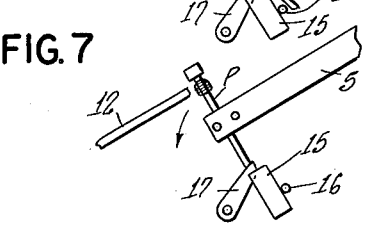
Figure 8:
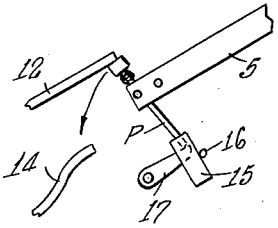
Figure 9:
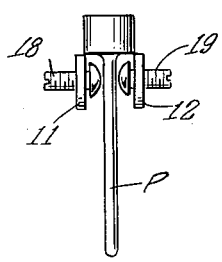
Fig. 9 is a front detail view of the same testing device situated at the entrance of an outlet conveyor path.

Located at the entrance of the rails 11 and 12 is a testing means comprising opposed set screws 18 and 19 (Fig. 2). The testing width can be adjusted to a desired magnitude by turning the set screws (Fig. 9). The set screws are to be adjusted so that the slender portion or other spacial dimension of the specimen can just pass if it is free of any residual yarn winding, whereas the specimen cannot pass through the testing location if a residual winding is present on the slender portion of the core. In this case, illustrated in Fig. 7, the specimen core, after lowering of the lever 17, will again extend its thicker head portion beneath the lower edges of the rails 11 and 12 and, since in the meantime the latch 9 has been pulled out, it will tip forwardly (Fig. 8), thus turning about its point of contact with the lever 17. If this specimen has the correct length, it can still enter into the second, or lower, discharging conveyor formed by the rails 13 and 14, as shown in Fig. 8. Thence the specimen is conveyed to a collecting container (not shown) reserved for those specimens which are eliminated from the process only because of the presence of a residual yarn winding. However, if, as shown in Fig. 5, the specimen is too short, it is in consequence lifted by arm 17 only an amount insufficient for it to pass onto the rails 11 and 12. Consequently, after the return motion of the lever 17, the short specimen will drop away toward the front of the machine an insufficient distance, so that it cannot reach the rails 13, 14. It passes through a free dropping space into a collecting container (not shown) located beneath that space.

In the above-described classifying means or checking and discarding device, the specimens are immediately classified into two or more essentially different kinds and accordingly can be passed to different subsequent types of fabrication processes or machines. In order to provide a simpler, and cheaper, testing apparatus requiring fewer components but nevertheless producing satisfactory checking, the system may be equipped with only one discarding conveyor in lieu of the plurality of conveyors above mentioned. This simpler machine retains the unsatisfactory specimens at the testing location until they are manually removed and sorted. This type of machine is of particular advantage in cases where only a few unsatisfactory specimens can enter into the feeder device. An embodiment of a simplified device of the just-mentioned type is shown in Fig. 10. In the device of Fig. 10, two step structures 21 and 22 are mounted on the respective rails 4 and 5. These step structures provide, with respect to rails 400 and 500, a height difference analogous to and approximately corresponding to the difference in height of the entrance end of rails 11, 12 relative to the rails 4 and 5 characteristic of the preceding embodiments. The lifting of the specimen in the machine of Fig. 10 takes place in the same manner as in the embodiment according to Figs. 2, 3. However, the lock mechanism in the device of Fig. 10 has a different design. It comprises two individual locks or latch devices, one located behind the other but connected with each other for parallel actuation. The locks form essentially two chambers. The chamber of the lower lock is so designed that it can accommodate two specimen bodies. The latch located between the upper chamber and the lower chamber is provided with a latch member 900 having a hook portion 23 which extends approximately parallel to the rail 500 and has the same length as the thick head portion of the specimen. In accordance herewith, the rail 500 has an elongated opening 24 extending parallel to the rail edge. A latch member 25 is provided at the lower chamber opposite the hook portion 23. The latch portion 23 of member 900 prevents a specimen from being pulled out in the upper range of the lower chamber.

The intermittent feed device or lock mechanism of Fig. 10 functions as follows: Behind the two step structures 21 and 22, two or more specimens or bobbins are supported, one behind the other, on top of both rails 400 and 500. Slightly above the height of the enlarged portion of the bobbins and a distance behind in the direction of motion, at a distance greater than the diameter of the bobbin stopped by the two steps 21, 22, is a latch member 25 to prevent the next following bobbin behind from being lifted above and off the rails concurrently with the bobbin halted by the step members, in the event the bobbin behind the one stopped by the step members 21, 22 is lifted by the lever means along with the one stopped by the step members. Latch member 25 is stationary. The lower member 902 jutting through a slot in the rail 500 and operated by pivoted member 901 is an intermittent stop member and is operated to act at the same time as the stop member 23, which is an extension of lever 900. The member 23, when acting as a stop member is long enough so that its edge is placed between the first and second bobbin when two coil bodies are located in front of the step structures 21, 22, contacting the second bobbin stem to prevent the second bobbin stem from being contacted at the time lever 17 in its movement contacts the first bobbin stem. Since the member 23 moves downward and outward, it will allow the second bobbin to take the position of the space, now empty, that was formerly occupied by the first bobbin. Members 800 and 801 act at the same time and opposite to the previously mentioned stop members to form two intermittent feeding devices, each acting successively and in unison with each other.

When a coil body glides along on rails 400 and 500, it is at first retained by the lever 800. When the lever 901 turns, the lever 800 is pulled back and the latching member 23 is pushed forward so that the coil body can glide downwardly up to abutment with this latching member 23. When the lever 901 is again turned, the latching member 23 is pulled back so that the coil body can glide up to step members 21, 22. If the coil body is in proper condition, i.e. if its stem length has the desired measure and if there is no winding residue on the coil body, then the head of the coil body is lifted over the step members 21, 22 and is at first arrested by another arching member (not designated by a numeral) which, during another turning motion of lever 901 releases the coil body until it abuts against the latch 26'.

However, if the coil body does not have the prescribed length or if a winding residue is located on the coil body, then this body cannot be lifted over the step structures 21, 22. Since, however, the latch member 23 is simultaneously pulled back, a new coil body glides against the coil body illustrated in Fig. 10 as being in front of the structures 21, 22. When the double lever 901 turns backwards, the edge of the latch member 23, visible in Fig. 10 between parts 400 and 500, pushes against the trunk of the coil body so that the latch member 23 cannot turn inwardly. This also prevents the lever 901 from performing a swinging motion and pulls the lever 800 back, thus releasing the supply of another coil body down the rails 400, 500. The latch member 25 has only the purpose of preventing an unintended lifting of the coil body located in front of the latch member 23. Such an inadvertent lifting may occur as a result of the fact that a coil body of normal length, but contacting a winding residue is located in front of the step structures 21, 22 and is being lifted, thereby also lifting the next adjacent coil body which is under pin 25. An inadvertent lifting is also possible when the lower end of the second coil body is seized by the part 17. In both cases, the inadvertent lifting of the second coil body could result in trouble during the further operation, such trouble being prevented by the latch member 25.

The conveyor path which, in this embodiment, is also formed by similar rails 400 and 500, extends all the way through. Hence it, in effect, combines the length of the rails 4, 5 with those of the rails 11, 12 (see Fig. 1). The device of Fig. 10 is further provided with a stopping and contact device comprising two contact arms 26, 26' which cooperate with an electric current source 27 and a signal lamp 28. An acoustic signal or a relay can be substituted for the signal lamp. Contact arms 26, 26' are periodically lifted and lowered by means of a lever 29, having a pivot 29', in order to permit passage of the specimen. The lever 29 can be moved by means of a linking rod 30 connected to oscillating arm 31' as described below. It may alternatively be effected by means of an electromagnet 31 controlled by means of a pair of contacts cooperating with the reciprocating member 17. Two contact leads $a$ and $b$ are connected into the circuit, as shown, to the coil of the electromagnet and to the electric battery 27, respectively. Lead $b$ is connected to member 17. The magnet 31 is energized by closing of the contacts at region 32, during each lifting movement of lever 17. The resulting excitation of magnet 31 causes attraction of its armature 310, thus moving the rod 30 and the lever 29 upwardly. As previously stated this raises the stop contact arm 26' above the upper end of specimen P so that the specimen can pass. The arriving specimen, prior to lifting of the contact arms 26, 26', abuts against the longer arm 26' and opens the contact so that the lamp 28 does not receive current and will not be lighted. This indicates that the specimen has successfully passed through the checking location. However, if the specimen is faulty, it cannot pass beyond the step structures 21, 22. This lights lamp 28 and indicates to the attendant that the faulty specimen is to be eliminated manually. If the manual operation has required a prolonged period of time, then a second specimen could enter into the lower chamber of the double lock. In order to prevent entering of a third specimen into the chamber, the hook portion 23 of latch 900 is designed to place itself against the slender portion of the specimen and thus prevents the operating motion of the lock lever 901 and, hence, also the opening of the entrance side of the latch 800. As soon as the attendant has thereafter eliminated the faulty specimen, the testing device can continue operating without any delay, this being due to the presence of a second specimen in the lower chamber. If this were not so, it would be necessary to first wait for the opening of the latch 800. In order to make certain that when the faulty specimen is being removed, the second specimen is not taken along, the above-mentioned latching member 25 is mounted opposite this second specimen.

In lieu of the electric drive of the lever 29 and the rod 30, the device can also be driven by means of an oscillating arm or lever 31', which in this case may simultaneously serve to drive the lever 17. For this purpose, a motor M drives a crank wheel 32' which is connected by a pitman rod 33 with the lever 31'. Lever 31' transmits its reciprocating motion to rod 30 and lever 29.

To facilitate and improve the adjustment of the magnitudes to be checked by the piston device, the catcher plate 15 is mounted on a shoulder or arm 35 which is guided in a slot 36 and can thereby be fixed in proper position by a bolt and nut means 360. The slot 36 extends parallel to the axis of the specimen when in normal position within the testing device. Similarly, the step structures 21, 22 are also provided with slots 36' which permit displacing these structures so as to obtain first or prior coaction of the lock devices and the step structures.

The successive positions of specimens in the apparatus of Fig. 10 are shown in Figs. 11 to 13. A specimen of standard size (Fig. 11) will, in the testing device of Fig. 10, pass above the height of the step structures, and hence will pass beyond these structures, whereas a specimen which is too short (Fig. 12) cannot pass over the step. A specimen which is too long will abut against the measuring pin 16, and in consequence cannot pass into the catcher sheet 15 and hence cannot be caught by the lever 17, thus likewise failing to pass over the step. Analogously, a specimen of perfect dimensions, but having a residual winding of yarn (Fig. 14), cannot overcome the step formed by the structures 21, 22, because of the interference of the residual yarn winding. It is therefore certain that the satisfactory specimens will pass into the subsequent fabricating operation, whereas all unsatisfactory specimens remain at the locking device where they are removed by hand.

It will be obvious to those skilled in the art upon a study of this disclosure, that devices according to my invention may be modified with respect to various details, and hence may be given embodiments other than those particularly illustrated and described herein, without departing from the essence or principle of the invention, and within the scope of the claims annexed hereto.

I claim:

1. A feeder and tester apparatus system for coil cores automatically supplied to a textile fabrication apparatus, the coil cores each having an enlarged head portion and a narrower stem portion, respective cores having stem portions of different lengths, said apparatus system, comprising means providing a conveyor path for the coil cores, said means providing support elements carrying the cores with their heads up and their stems down, means providing an obstacle to the movement of cores passing along the conveyor path means, a positioning device including lift means positioned to contact at the lower stem end only a core which is stopped by said obstacle and to individually lift the contacted core to enable it to pass the obstacle means, the lift means being positioned a predetermined distance from said support elements, the latter thus forming a datum plane for measurement of said lengths, said lift means being ineffective to lift, through the required height, a core having a cam shorter than a pre-set length.

2. A feeder and tester apparatus system for coil cores automatically supplied to a textile fabrication apparatus, the coil cores each having an enlarged head portion and a narrower stem portion, respective cores having stem portions of different lengths, said apparatus system, comprising means providing a conveyor path for the coil cores, said means providing support elements carrying the cores with their heads up and their stems down, means providing an obstacle to the movement of cores passing along the conveyor path means, a positioning device including lift means positioned to contact at the lower stem end only a core which is stopped by said obstacle and to individually lift the contacted core to enable it to pass the obstacle means, the lift means being positioned a predetermined distance from said support elements, the latter thus forming a datum plane for measurement of said lengths, said lift means being ineffective to lift, through the required height, a core having a stem shorter than a pre-set length, and a device which automatically signals when a coil core fails to pass the obstacle means, said device including a sensing means juxtaposed with respect to the path of the cores normally leaving said obstacle means.

3. A feeder and tester apparatus for coil cores to be automatically supplied to a textile fabricating machine, the coil cores each having an enlarged head portion and a narrow stem portion, comprising means for transferring the coil cores from one location to a selected one of several other locations, said means carrying the cores with their stems down and their heads up, core receiving means at a first, upper one of said other locations, means operatively connected to the latter receiving means to determine whether the coil cores have a residual winding on the stem portions and to reject the core if it does, a positioning device including means contacting each core at its lower end to individually lift each core to enable transfer to said upper location for reception onto or for rejection from said core receiving means, the positioning means thereat enabling transfer of the core to a second, lower one of said locations, the lift means being ineffective to lift, through a sufficient distance, a core having a stem length shorter than a pre-set length, the core of short stem length being thereby disabled, by its short length, from lift transfer to said upper location and from reaching the said second location.

4. A feeder and tester apparatus for coil cores automatically supplied to a textile fabricating apparatus, the coil cores each having an enlarged head portion and a narrow stem portion, comprising gravity slide-way means for transferring the coil cores from one location to a selected one of several other locations, said slide-way means carrying the cores with their stems down and their heads up, removable stop means to control the transfer, core receiving and conveyance means at a first, upper one of said locations, caliper gauge means at the entrance to the latter conveyance means to determine whether the coil cores have a residual winding on the stem portions and to reject the core if it does, a positioning device including means to individually lift each core, by contact at its lower end, to enable transfer to said upper location for reception onto or rejection from said core conveyance means upon withdrawal of the stop means, the positioning means thereat enabling transfer of the core to a second, lower one of said locations, the lift means being ineffective to lift, through a sufficient distance, a core having a stem length shorter than a pre-set length, the core of short stem length being disabled, by reason of its short stem length, from lift transfer to said upper location and from reaching the said second location, and being available for removal to a third receiving location, the lift means comprising a reciprocating lever, the positioning device including a member having an aperture extending generally lengthwise of the downwardly extending stem of a core halted by said stop means, the lever having a portion reciprocating in said aperture, and including means conjointly reciprocating said lever and positioning and removing said stop means, an upper edge of said member ordinarily overlapping a lower part of the downwardly extending stem, the lever raising the lower end of the stem to a point above the upper edge of the said member if the stem is of sufficient pre-determined length, means to render the positioning device ineffective to transfer the core to either of the first and second locations when it is longer than a pre-set length, said latter means comprising an element disposed adjacent the aperture of said member, the element barring the lower end of the too long core from the lifting range of operation of the lever.

5. A feeder and tester apparatus system for coil cores automatically supplied to a textile fabrication apparatus, the coil cores each having an enlarged head portion and a narrower stem portion, comprising means providing a conveyor path for the coil cores, said means providing support elements carrying the cores with their heads up and their stems down, means providing an obstacle to the movement of the cores comprising a step structure on the conveyor path means in the path of cores passing therealong, a positioning device including lift means contacting each core at its lower end to individually lift the contacted core to enable it to surmount the obstacle means, the lift means being ineffective to lift, through the height required for said surmounting, a core having a stem shorter than a preset length, spaced lock means providing a lock chamber adjacent the obstacle to halt the operation of the lift means and to limit the number of cores in said chamber when a core fails to surmount the obstacle, means positionable in the path of the core after it passes said obstacle means, electric contacts connected to said positionable means and adapted to be opened by the weight of a core against the positionable means and to close when no core is there, circuit means connected to said electric contacts, an indicating device operably connected to said circuit means, the indicating device being thereby actuated when no core is adjacent the positionable means and non-actuated when a core is adjacent thereto, means to remove the positionable means out of the path of the cores on the conveyor path means so that a core can pass by it, said latter means and the lift means being conjointly operated to permit the cores lifted by the lift means over the obstacle means to pass the positionable means.

6. A feeder and tester apparatus system for coil cores automatically supplied to a textile fabrication apparatus, the coil cores each having an enlarged head portion and a narrow stem portion, comprising means providing a downwardly inclined gravity conveyor path for the coil cores, said means providing support elements carrying the cores with their heads up and their stems down, means providing an obstacle to the movement of the cores, means comprising a step structure on the conveyor path means in the path of cores passing therealong, a positioning device including lift means contacting each core at its lower end to individually lift the contacted core to enable it to pass the obstacle means, the lift means being ineffective to lift, through the required height, a core having a stem shorter than a pre-set length, spaced lock means providing a lock chamber adjacent the obstacle to halt the operation of the lift means and to limit the number of cores in said chamber when a core fails to pass the obstacle means, means positionable in the path of the core after it passes said obstacle means, electric contacts connected to said positionable means and adapted to be opened by the weight of a core against the positionable means and to close when no core is there, circuit means connected to said electric contacts, an indicating device operably connected to said circuit means, the indicating device being thereby actuated when no core is adjacent the positionable means and non-actuated when a core is adjacent thereto, means to remove the positionable means out of the path of the cores on the conveyor path means so that a core can pass by it, said latter means and the lift means being conjointly operated to permit the cores, that have been lifted by the lift means over the obstacle means, to also pass the positionable means, said lift means comprising a reciprocating lever, said lock means including two spaced members operatively linked together, one upper one of which is mounted for sequential placement into and withdrawal from said conveyor path means, and the second and lower one for halting the lever to provide said halting of the operation of the lift means, said two spaced members being positioned above the step structure, said lock means further including a third member movable into a position below the step structure and operably connected to the lever for conjoint operation therewith to permit further passage of a core that passes the step structure.

7. A feeding and sorting apparatus system for a series of objects, which objects each comprise a stem portion and an enlarged portion of wider dimension than the stem portion, respective objects having stem portions of different lengths, the apparatus system comprising a conveyance means, the system providing means arranging the objects with their enlarged portions extending in the same direction on the conveyance means, the conveyance means comprising support means for the objects, means operatively juxtaposed with respect to the support means to classify the objects in accordance with at least one spacial dimension including said lengths of said stem portions, the classifying means including an automatic device for controlling the delivery of the objects which are standard, in respect to these characteristics, to one location, and those that are sub-standard to another location, said device comprising obstacle means in the path of said objects and automatic means to pass said objects by said obstacle means.

8. A feeding and sorting apparatus system for a series of elongated objects, which objects each comprise a stem portion and an enlarged portion of wider dimension than the stem portion, respective objects having stem portions of different lengths, the apparatus system comprising a conveyance means, the system providing means arranging the objects with their enlarged portions extending in the same direction on the conveyance means, the conveyance means comprising support means for the objects, means operatively juxtaposed with respect to the support means to classify the objects in accordance with at least one spacial dimension including said lengths of said stem portions, the classifying means including an automatic device for controlling the delivery of the objects which are standard, in respect to these characteristics, to one location, and those that are sub-standard to another location, said device including a testing means comprising a step device in the path of said objects and automatic means operative to lift only standard objects sufficiently to pass over and clear said step device.

9. A feeding, testing and classifying apparatus system for a series of bobbins, which bobbins each comprise a stem portion and an enlarged portion of wider dimension than the stem portion, respective bobbins having stem portions of different lengths, the apparatus system comprising a conveyance means, the conveyance means comprising support means for suspending the bobbins by their enlarged portions, means operatively juxtaposed with respect to the support means to classify the objects in accordance with the lengths of the stem portions, the classifying means including an automatic device for controlling the delivery of the bobbins which are standard, in respect to stem length, to one location, and those that are sub-standard to another location, said device comprising stationary obstacle means in the path of the stem portions of the bobbins and automatic and periodically operated means positioned to contact at the lower stem end only a bobbin which is stopped by said obstacle means and to lift the bobbins of standard length to enable them to pass said obstacle means, said periodically operated means being positioned a predetermined distance from said support elements, the latter thus forming a datum plane for measurement of said lengths, said lift means being ineffective to lift, through the required height, a bobbin having a stem shorter than a pre-set length.

10. In a feeding and sorting apparatus system for a series of elongated objects, which object comprises a stem portion and an enlarged portion of wider dimension than the stem portion, respective objects having stem portions of different lengths, the apparatus system comprising a hopper for the objects, a conveyor apparatus comprising an upwardly inclined conveyor, the conveyor including an upwardly inclined stationary surface serving as a guide for the objects and an endless conveyor chain a portion of which runs upwardly along said inclined surface, and a downwardly inclined gravity guide-way to the upper region of which the said conveyor delivers the objects from the hopper, the conveyor having means for delivering the objects with their enlarged portions up and their stem portions down, the guideway comprising two lengthwise downwardly inclined mutually opposed support means for suspension of the objects by the enlarged portions, in combination therewith, the improvement comprising means operatively juxtaposed with respect to the support means to classify the objects in accordance with the lengths of the stem portions, the classifying means delivering the objects which are standard, in respect to stem length, to one location, and those that are sub-standard to another location, the classifying means comprising a step-device interposed in the path of the stem portions, and periodically operated means positioned a predetermined distance below the conveyor path and operated periodically so as to lift the bobbins having standard length to enable the stem portions to pass over the step-device.

11. A device for sorting bodies having a slender portion and a thicker portion, comprising means providing a downward conveyor path for a series of said bodies, a testing device mounted in said path to separate standard from sub-standard bodies, said testing device comprising a step means which contacts said bodies, and an automatically operated lifting device effective to lift only standard bodies over the step means, the conveyor path means comprising downwardly sloping support means for suspending the bodies with their slender portions extending downwardly, said lifting device contacting the lower part of the slender portion of bodies of standard length as they pass along the conveyor path means.

12. A device for sorting bodies having a slender portion and a thicker portion, comprising means providing a downward conveyor path for a series of said bodies, a testing device mounted in said path to separate standard from sub-standard bodies, said testing device comprising a step means which contacts said bodies, and an automatically operated lifting device positioned a predetermined distance below the conveyor path and operated periodically so as to lift only standard bodies over the step means, the conveyor path means comprising downwardly sloping support means for suspending the bodies with their slender portions extending downwardly, the step device being arranged relative to the conveyor path means for contacting the thicker portion of the foremost body successively as the bodies pass along the conveyor path means, whereby all bodies having a predetermined stem length can be moved over said stop means by said lifting device.

13. An apparatus system for feeding, testing and sorting a series of elongated objects, wherein the sorting portion of the apparatus is responsive to the testing portion and wherein each object comprises a stem portion and an enlarged portion of wider dimension than the stem portion, the apparatus system comprising a hopper for the objects, a conveyor apparatus comprising an upwardly inclined conveyor, the conveyor including an upwardly inclined stationary surface serving as a guide for the objects and an endless conveyor chain a portion of which runs upwardly along said inclined surface, and a downwardly inclined gravity guide-way to the upper region of which the said conveyor delivers the objects from the hopper, the conveyor having means for delivering the objects with their enlarged portions up and their stem portions down, the guide-way comprising two lengthwise downwardly inclined mutually opposed support means for suspension of the objects by the enlarged portions, means comprising a lift device and a lock device operatively juxtaposed with respect to the support means to classify the objects in accordance with a spacial dimension, the classifying means delivering the objects which are standard, in respect to said spacial dimension, to one location, and those that are sub-standard to another location, the lift device being positioned a predetermined distance from said support means and operably linked for cyclical operation with said lock device such that the lock device advances those objects serially which are of standard spacial dimension and holds back the remaining objects on said support means, and such that said lift device acts against the lower end of a respective stem to lift the corresponding object of standard spacial dimensions to enable it to pass said lock device for travel to said one location, said objects which are not of standard spacial dimensions for contacting by said lift device being then released by said lock device for movement on the support means to said other location.

14. An apparatus system for feeding, testing and sorting a series of elongated objects, wherein the sorting portion of the apparatus is responsive to the testing portion and wherein said objects each comprise a stem portion and an enlarged portion of wider dimensions than the stem portions, the apparatus system comprising a conveyor apparatus comprising an upwardly inclined conveyor, the conveyor including an upwardly inclined stationary surface serving as a guide for the objects and further including an endless conveyor chain a portion of which runs upwardly along said inclined surface, and a downwardly inclined gravity guide-way to the upper region of which the said conveyor apparatus delivers the objects, the conveyor apparatus having means for so delivering the objects with their enlarged portions up and their stem portions down, the guide-way comprising two lengthwise extending, downwardly inclined mutually opposed support means for suspension of the objects by the enlarged portions, means operatively juxtaposed with respect to the support means to classify the objects in accordance with at least one spacial dimension, the classifying means delivering the objects which are standard, in respect to said one spacial dimension, to one location, and those that are sub-standard to another location, said classifying means comprising a mechanism providing an obstacle means for halting the objects on the guide-way at a point removed from the upper end of the guide-way, means forming part of said classifying means and located adjacent said obstacle means for determining another spacial dimension so as to determine the presence or absence of added material on said objects, a plurality of receiving means for the objects, one of said receiving means being disposed below and another above the lower end of the guide-way, selective means governed by said classifying means to remove said obstacle means and to lift those objects which are standard in said one spacial dimension for delivery to the upper receiving means and to remove said obstacle for passage of those objects which are non-standard in said other spacial dimension to the lower receiving means.

15. An apparatus system for feeding, testing and sorting a series of elongated objects, wherein the sorting portion of the apparatus is responsive to the testing portion and wherein said objects each comprise a stem portion and an enlarged portion of wider dimensions than the stem portions, the apparatus system comprising a conveyor apparatus comprising an upwardly inclined conveyor, the conveyor including an upwardly inclined stationary surface serving as a guide for the objects and further including an endless conveyor chain a portion of which runs upwardly along said inclined surface, and a downwardly inclined gravity guide-way to the upper region of which the said conveyor apparatus delivers the objects, the conveyor apparatus having means for so delivering the objects with their enlarged portions up and their stem portions down, the guide-way comprising two lengthwise extending, downwardly inclined mutually opposed support means for suspension of the objects by the enlarged portions, means operatively juxtaposed with respect to the support means to classify the objects in accordance with at least one spacial dimension, the classifying means delivering the objects which are standard, in respect to said one spacial dimension, to one location, and those that are sub-standard to another location, said classifying means comprising a mechanism providing an obstacle means for halting the objects on the guide-way at a point removed from the upper end of the guide-way, means forming part of said classifying means and located adjacent said obstacle means for determining another spacial dimension so as to determine the presence or absence of added material on said objects, a plurality of receiving means for the objects, one of said receiving means being disposed below and another above the lower end of the guide-way, selective means governed by said classifying means to remove said obstacle means and to lift those objects which are standard in said one spacial dimension for delivery to the upper receiving means and to remove said obstacle for passage of those objects which are non-standard in said other spacial dimension to the lower receiving means, the upper and lower receiving means comprising guide-ways having receiving portions positioned adjacent the lower ends of the said support means.

16. A feeding and classifying apparatus system for a series of elongated objects, which objects each comprise a stem portion and an enlarged portion of wider dimension than the stem portion, respective objects having stem portions of different lengths and some of the objects having added material thereon influencing their width at a predetermined location on the object, the apparatus system comprising a source means for the objects, a generally downwardly directed gravity guide-way, a conveyor apparatus arranged to receive the objects from said source means and to deliver them to said guide-way, said guide-way comprising two lengthwise downwardly inclined mutually opposed support means for suspension of the objects with their enlarged portions extending in the same direction and for advancement of said object along said guide-way in sequence, means operatively arranged with respect to the support means to classify the objects in accordance with at least one of its spacial dimensions, the classifying means delivering the objects which are standard, in respect to these dimensions, to one location, and those that are sub-standard to another location, said classifying means comprising a mechanism providing an obstacle means for halting the objects on the guide-way at a point removed from the upper end of the guide-way, and further providing means adjacent said obstacle means for determining the width at said predetermined location so as to detect the presence or absence of said added material on said objects, and means governed by said classifying means to enable the object to continue past the obstacle means for delivery to said other location.

17. A feeder and tester apparatus for coil cores to be automatically supplied to a textile fabricating machine, the coil cores each having an enlarged head portion and a narrow stem portion, comprising guide-way means for carrying the cores in line with their stems down and their heads up, means for transferring the coil cores from said guide-way means to a selected one of several receiving locations, removable stop means to control the transfer, core receiving means at a first, upper one of said locations, width gauge means operatively connected to the latter receiving means to determine whether the coil cores have a residual winding on the stem portions and to obstruct passage of the core to said upper location if it does, a positioning device forming part of said transferring means and including lift means placed a predetermined distance below said guideway for contacting each core of a predetermined length at its lower end to individually lift the core to enable transfer to said upper location for reception onto or for rejection from said upper core receiving means upon withdrawal of the stop means, said removable stop means controlling the transfer being cyclically operated and located so as to allow only the first core in line to become positioned over said lift means such that stems shorter than said predetermined length cannot be lifted by said lift means to said upper location, said lift means and said stop means being operably interconnected and coordinated with their respective movements, the positioning means upon withdrawal of the stop means enabling transfer of the core to a second, lower one of said locations, the lift means being ineffective to lift, through a sufficient distance, a core having a stem length shorter than said predetermined length, the core of short stem length being thereby disabled, by its short stem length, from lift transfer to said upper location and also from reaching said second location, and being free to drop down to a third of said receiving locations intermediate said guide-way and said second location, and obstacle means for withholding cores which have a stem longer than said predetermined length so as to render the lift means ineffective to transfer such latter core to either of the first and second locations, whereby said cores with stems shorter than said predetermined length also are free to drop down to said third receiving location.

References Cited in the file of this patent
UNITED STATES PATENTS

| | | |
|---|---|---|
| 1,496,080 | Alderman | June 3, 1924 |
| 1,556,469 | Alderman | Oct. 6, 1925 |
| 1,607,932 | Whitmore et al. | Nov. 23, 1926 |
| 2,435,635 | Niederer et al. | Feb. 10, 1948 |
| 2,459,309 | Cotchett | Jan. 18, 1949 |
| 2,634,489 | Root | Apr. 14, 1953 |
| 2,868,372 | Ferguson | Jan. 13, 1959 |